(12) United States Patent
Ueda

(10) Patent No.: US 10,557,974 B2
(45) Date of Patent: Feb. 11, 2020

(54) OPTICAL ELEMENT, OPTICAL APPARATUS, AND METHOD FOR FORMING RANDOM UNEVEN SHAPE

(71) Applicant: CANON KABUSHIKI KAISHA, Tokyo (JP)

(72) Inventor: Kei Ueda, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 15/664,164

(22) Filed: Jul. 31, 2017

(65) Prior Publication Data

US 2018/0038999 A1 Feb. 8, 2018

(30) Foreign Application Priority Data

Aug. 2, 2016 (JP) .................................. 2016-152039

(51) Int. Cl.
*G02B 5/02* (2006.01)
*G03B 11/00* (2006.01)

(52) U.S. Cl.
CPC ......... *G02B 5/0257* (2013.01); *G02B 5/0268* (2013.01); *G03B 11/00* (2013.01)

(58) Field of Classification Search
CPC ...... G02B 5/02; G02B 5/0205; G02B 5/0257; G02B 5/0268; G02B 5/0273; G02B 5/0294; G02B 1/11; G02B 1/113; G02B 1/115; G02B 5/28; G02B 5/285; G02B 5/286; G02B 5/20; G02B 5/201; G02B 5/305
See application file for complete search history.

(56) References Cited

U.S. PATENT DOCUMENTS

| | | | |
|---|---|---|---|
| 6,836,619 B2 | 12/2004 | Ohmura | |
| 2008/0176041 A1* | 7/2008 | Sato | H01L 51/0097 428/161 |
| 2014/0210995 A1* | 7/2014 | Abe | G01R 31/2635 348/93 |

FOREIGN PATENT DOCUMENTS

| | | |
|---|---|---|
| JP | 4845290 B2 | 12/2011 |
| JP | 5510865 B2 | 6/2014 |
| JP | 2014119552 A | 6/2014 |

* cited by examiner

*Primary Examiner* — Robert E. Tallman
(74) *Attorney, Agent, or Firm* — Rossi, Kimms & McDowell LLP

(57) ABSTRACT

An optical element includes an optical surface with a random uneven shape that satisfies $0.30 \leq I_{center} \leq 1.00$ and $0.00 \leq C_{2nd} \leq 0.60$ where P is an average pitch, $I_{center}$ is a ratio of a component intensity sum from 0.9P to 1.1P to a component intensity sum of an entire frequency spectrum calculated with a square area in which each side is equal to or longer than 40 μm, and $C_{2nd}$ is a value of a second largest intensity peak in an autocorrelation function calculated with a square area in which each side is 20P.

12 Claims, 18 Drawing Sheets

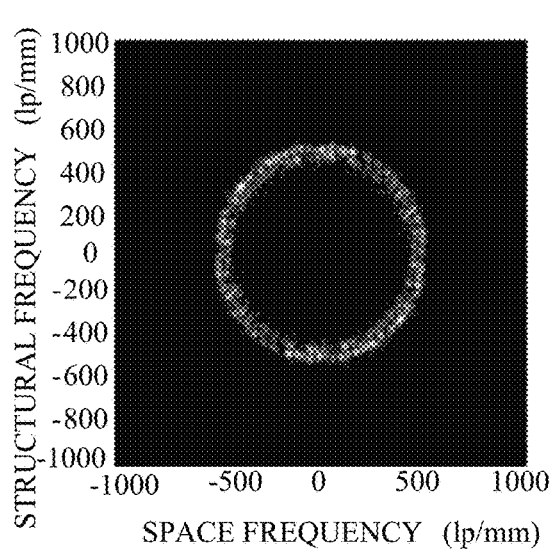
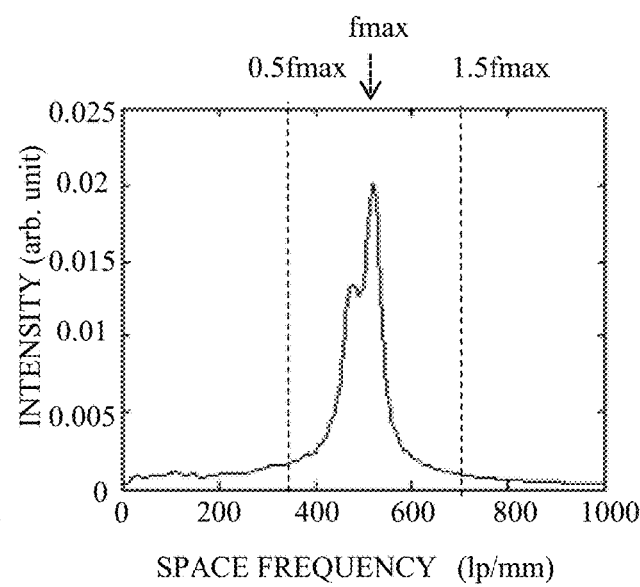
FIG. 4A
FIG. 4B
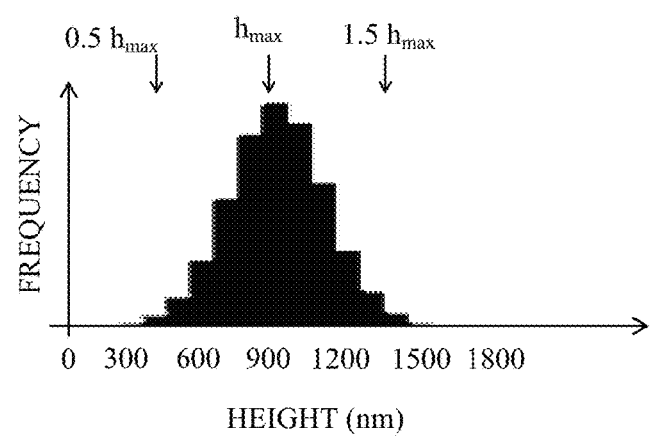
FIG. 5

SPATIAL FREQUENCY (lp/mm) FOR EACH
OF ORDINATE AXIS AND ABSCISSA AXIS

SPATIAL FREQUENCY (lp/mm) FOR EACH
OF ORDINATE AXIS AND ABSCISSA AXIS

OPTICAL ELEMENT, OPTICAL APPARATUS, AND METHOD FOR FORMING RANDOM UNEVEN SHAPE

BACKGROUND OF THE INVENTION

Field of the Invention

The present invention relates to an optical element, an optical apparatus, and a method for forming a random uneven shape.

Description of the Related Art

Use of a random uneven shape for a diffusion plate has recently been developed. The light diffusion with an ordered shape can control a diffused angle range through a pitch, but generates an azimuthal anisotropy that causes a steep intensity peak at a specific angle. The azimuthal anisotropy causes strong glares at specific observation angles. The light diffusion with a random uneven shape can relax the azimuthal anisotropy but cannot provide a desired diffusion angle distribution to a perfectly disordered random structure. For the desired diffusion angle distribution, a random shape is necessary with a specified average pitch.

Japanese Patent No. 4,845,290 discloses a focus plate having an optical surface with a random uneven shape that has the irregularity by using a specific position shift parameter from an ordered shape. Japanese Patent No. 2014-119552 discloses an anti-glare film which has an optical surface with a random uneven shape, and exhibits a Gaussian-shaped frequency spectrum formed through frequency filtering.

SUMMARY OF THE INVENTION

The present invention provides an optical element and an optical apparatus, each of which has a diffusion angle characteristic with a small azimuthal anisotropy and can reduce scattering of the diffusion angle characteristic for an incident beam with a small diameter.

An optical element according to one aspect of the present invention includes an optical surface with a random uneven shape that satisfies $0.30 \leq I_{center} \leq 1.00$ and $0.00 \leq C_{2nd} \leq 0.60$ where P is an average pitch, $I_{center}$ is a ratio of a component intensity sum from 0.9P to 1.1P to a component intensity sum of an entire frequency spectrum calculated with a square area in which each side is equal to or longer than 40 µm, and $C_{2nd}$ is a value of a second largest intensity peak in an autocorrelation function calculated with a square area in which each side is 20P.

Further features of the present invention will become apparent from the following description of exemplary embodiments with reference to the attached drawings.

BRIEF DESCRIPTION OF THE DRAWINGS

FIGS. 4A and 4B illustrate frequency spectra of the random uneven shape according to the first embodiment.

FIG. 5 is a height frequency histogram of the random uneven shape according to the first embodiment.

DESCRIPTION OF THE EMBODIMENTS

Figure 1A:
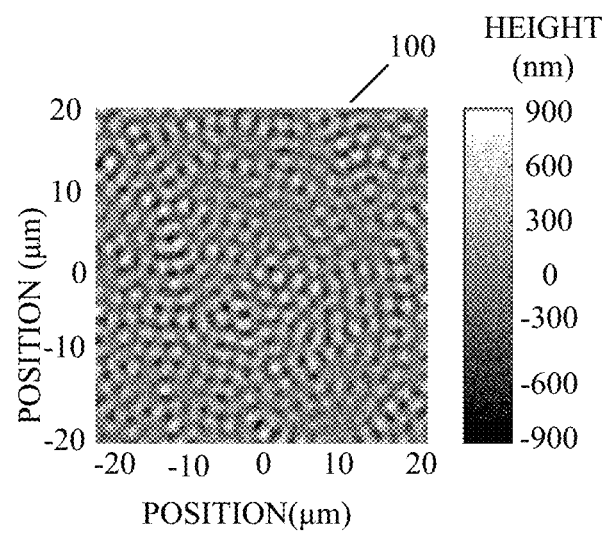
FIGS. 1A and 1B illustrate a random uneven shape according to a first embodiment.

Referring now to the accompanying drawings, a description will be given of embodiments of the present invention. In each figure, the same element will be designated by the same reference numeral, and a duplicate description will be omitted.

First Embodiment

Figure 1B:
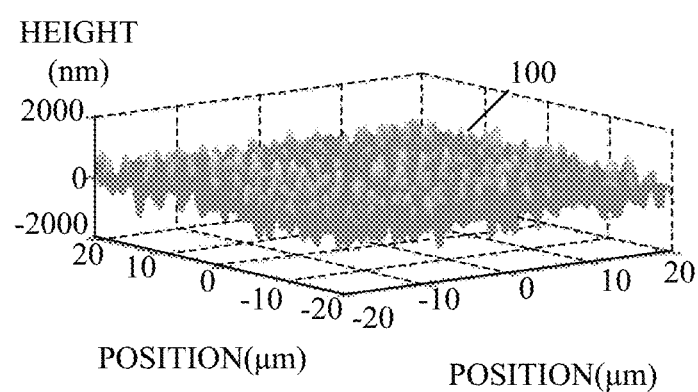

FIGS. 1A and 1B illustrate a random uneven shape 100 according to this embodiment. FIG. 1A illustrates its bird's eye view (top view), and FIG. 1B is its perspective view. In the following description, two directions orthogonal to FIG. 1 are set to X and Y directions. The random uneven shape 100 is formed, for example, on an optical surface of an optical element, such as a light diffusion element. The random uneven shape, as used herein, means a shape designed to have dominantly a frequency component of a specified band. The random uneven shape 100 is formed by convolution a function corresponding to the frequency filter for a uniform random number. Table 1 summarizes an illustrative structure parameter of the random uneven shape 100.

A description will now be given of a method for forming the random uneven shape 100. Forming the random uneven shape 100 uses as a frequency filter a function g(r) expressed by the following expression (3) corresponding to a difference between two sinc functions fH(r) and fL(r) expressed by the following expressions (1) and (2), where r is a distance from an origin, α and β, are constants.

$$fH(r)=[\sin(n r/PH)]/(n r/PH) \quad (1)$$

$$fL(r)=[\sin(n r/PL)]/(n r/PL) \quad (2)$$

$$g(r)=\alpha fH(r)-\beta fL(r) \quad (3)$$

$$\alpha=\int |fH(r)| dr \quad (4)$$

$$\beta=\int |fL(r)| dr \quad (5)$$

Figure 2A:
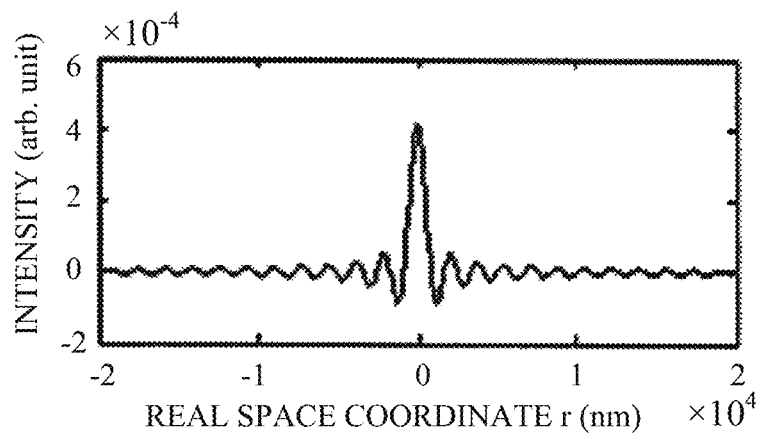
FIGS. 2A, 2B, and 2C are one-dimensional sectional views of a frequency filter used to form the random uneven shape according to the first embodiment.
Figure 2B:
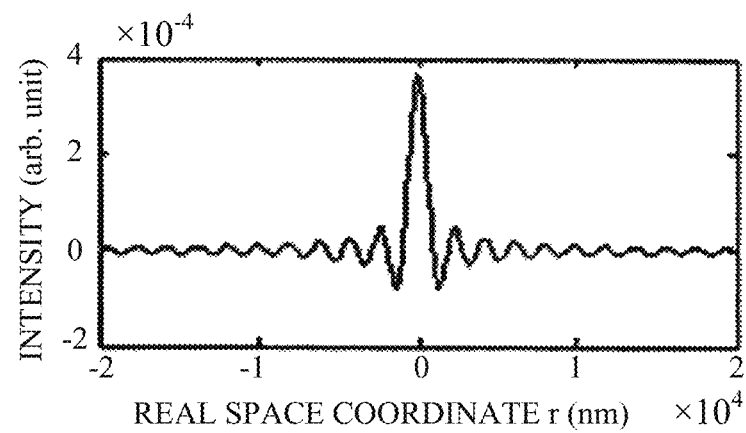
Figure 2C:
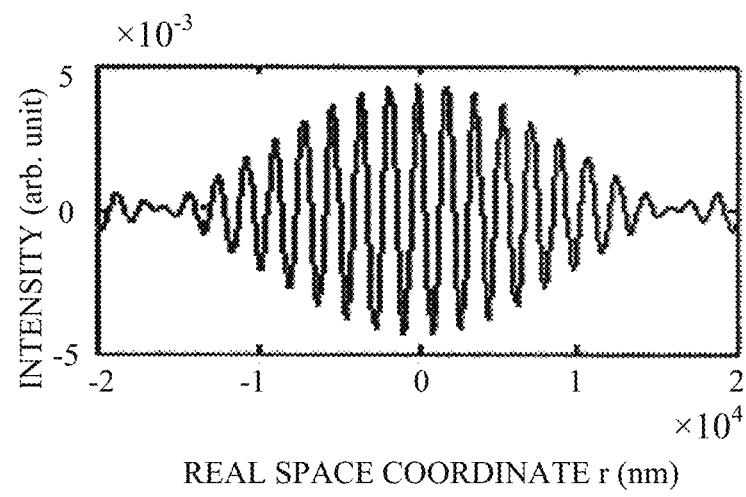

FIG. 2A is a one-dimensional sectional view of fL(r), FIG. 2B is a one-dimensional sectional view of fH(r), and FIG. 2C is a one-dimensional sectional view of g(r). PH represents 1900 nm, and PL represents 2100 nm. A convolution by a sinc function corresponds to an application of a low-pass filter with a rect function on a frequency space. Thus, when the function g(r) expressed by the expression (3) corresponding to a difference between constant multiples of the sinc function is used for convolution, the g(r) serves as a band-pass filter that extracts only a periodic component from PH to PL.

Figure 3A:
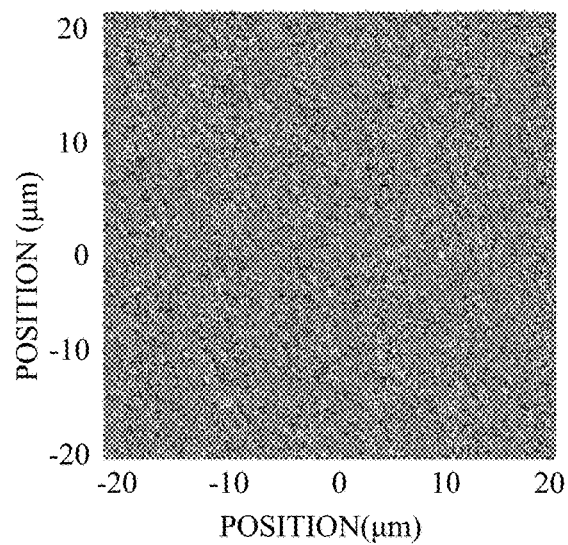
FIGS. 3A, 3B, 3C, and 3D illustrate real shapes and frequency characteristics before and after frequency filtering.
Figure 3B:
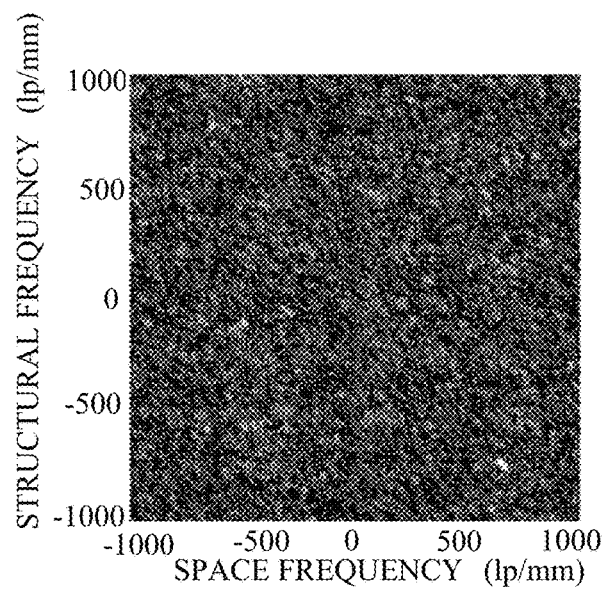
Figure 3C:
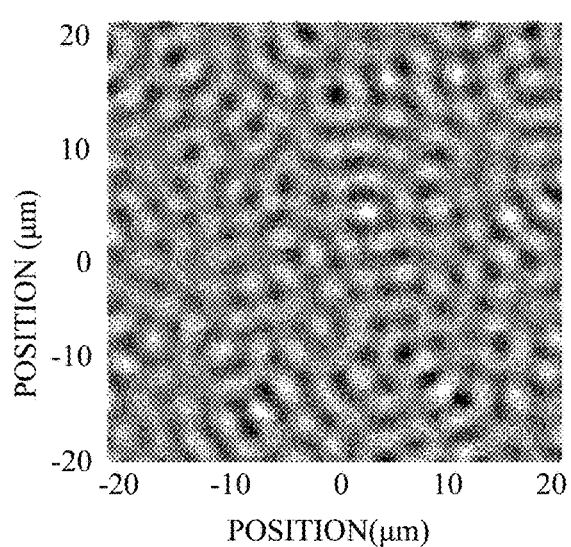
Figure 3D:
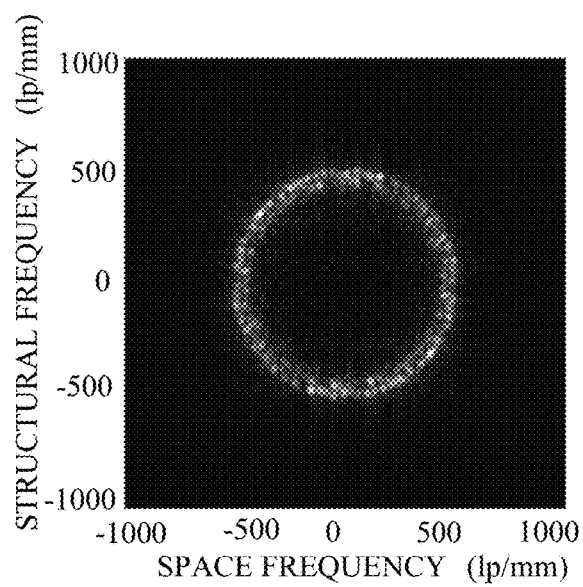

FIGS. 3A and 3B are a distribution by a uniform random number as a filtered distribution and a frequency characteristic. FIGS. 3C and 3D are a post-convolution fine uneven distribution and frequency characteristic. It is understood from FIG. 3D that only the specific frequency component is extracted and convolution by the function g(r) serves as a band-pass filter.

Now define P as an average pitch of the random uneven shape 100 and $I_{center}$ as a ratio of a component intensity sum from 0.9P to 1.1P to a component intensity sum of an entire frequency spectrum. In other words, the ratio $I_{center}$ is a value representing a concentration degree of the frequency component. In addition, define $C_{2nd}$ as a value representing a second highest intensity peak in an autocorrelation function normalized with the origin as 1. In other words, the intensity peak value $C_{2nd}$ is a value representing structural randomness. The random uneven shape 100 satisfies the following conditional expression (6) and (7) so as to have a diffusion angle characteristic having a small azimuthal anisotropy and to reduce scattering of the diffusion angle characteristic for an incident beam with a small diameter.

$$0.30 \leq I_{center} \leq 1.00 \quad (6)$$

$$0.00 \leq C_{2nd} \leq 0.60 \quad (7)$$

The frequency spectrum calculation uses a square area in which each side has 40 μm or longer. The autocorrelation function calculation uses a square area in which each side has 20P. The area used for the frequency spectrum calculation can restrain scattering by the random uneven shape, and may be larger.

The ratio $I_{center}$ lower than the lower limit value in the conditional expression (6) is not desirable because of local scattering in the diffusion angle characteristic even when the conditional expression (7) is satisfied. Since both of the ratio $I_{center}$ and the intensity peak value $C_{2nd}$ are intensity ratios, the ratio $I_{center}$ is never larger than 1.00 or the intensity peak value $C_{2nd}$ is never lower than 0.00.

FIGS. 4A and 4B illustrate frequency spectra of the random uneven shape 100. FIG. 4A illustrates a two-dimensional frequency spectrum, and FIG. 4B illustrates a linearized two-dimensional frequency spectrum (linear frequency spectrum) in a radial direction. The frequency spectrum is calculated with uneven shape data of an area of 40 μm×40 μm divided with a mesh of 100 nm in the XY directions. Height direction data on the uneven shape is offset so that the average becomes 0.

The average pitch P is an average value of intervals between convex parts on the random uneven shape 100, and calculated with a weighted average of a linearized frequency spectrum in FIG. 4B. This embodiment limits a band used to calculate the average pitch P. More specifically, where fmax is a frequency providing a maximum intensity, it is used for a weighted average calculation only in a range from 0.5fmax to 1.5fmax. Thereby, the average pitch P can be calculated without containing a high order frequency component other than a fundamental frequency. This embodiment calculates the average pitch as 2000 nm, as disclosed in Table 1. The ratio $I_{center}$ of the component intensity sum from 0.9P to 1.1P to the entire component intensity sum is 0.57 as illustrated in Table 1 and satisfies the conditional expression (6).

The average height is calculated with the uneven shape data of an area of 40 μm×40 μm divided with a mesh of 100 nm in the XY directions. FIG. 5 illustrates a resultant histogram of height values on the random uneven shape 100 for each 100 nm. This embodiment limits the band used to calculate the average height h. More specifically, where hmax is a height providing the maximum frequency, only a range from 0.5hmax to 1.5hmax is used to calculate the weighted average. This embodiment calculates the average height "h" as 900 nm, as illustrated in Table 1.

Figure 6A:
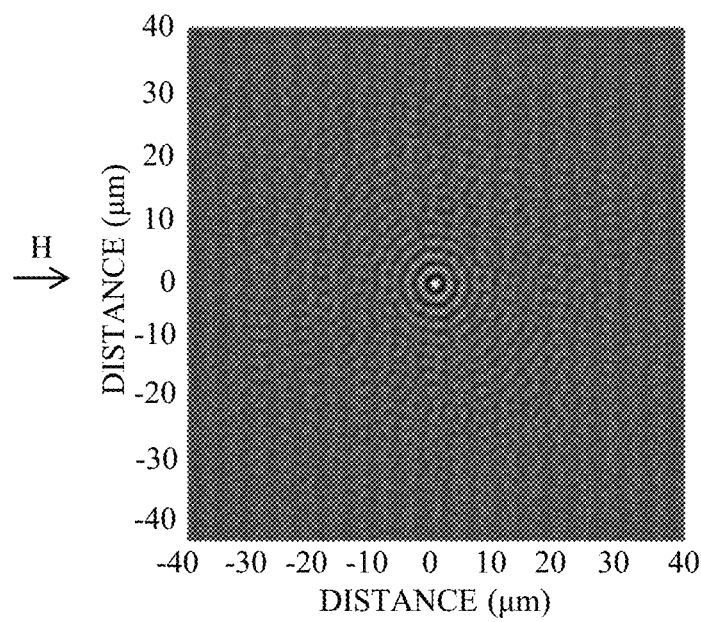
FIGS. 6A and 6B are explanatory views of an autocorrelation function of the random uneven shape according to the first embodiment.
Figure 6B:
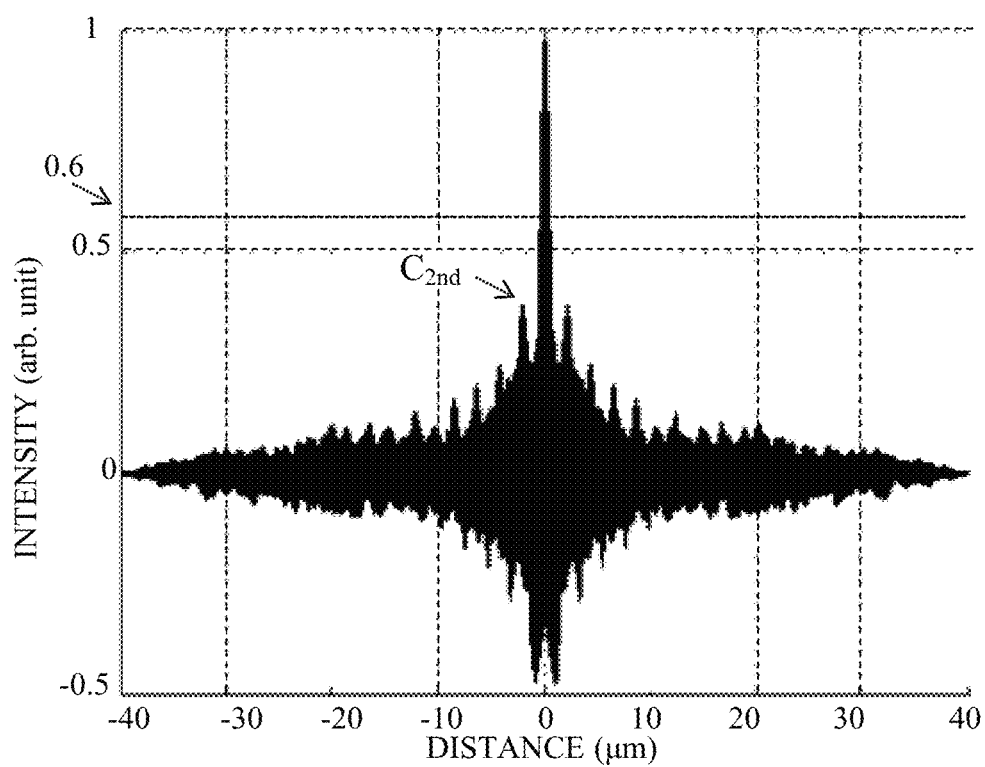

FIGS. 6A and 6B are explanatory views of the autocorrelation function of the random uneven shape 100. FIG. 6A illustrates a bird's eye view of the autocorrelation function of the random uneven shape 100, and FIG. 6B illustrates the autocorrelation function when FIG. 6A is observed in the H direction. The autocorrelation function is calculated with uneven shape data of an area 20P×20P divided with a mesh of 100 nm in the XY directions. The height direction data of the uneven shape is offset so that the average can be 0. The intensity peak value $C_{2nd}$ is 0.18 as illustrated in Table 1 and satisfies the conditional expression (7).

Figure 7A:
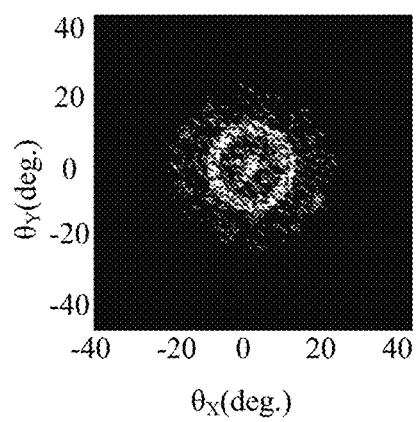
FIGS. 7A and 7B are far field angle distribution diagrams of the random uneven shape according to the first embodiment.
Figure 7B:
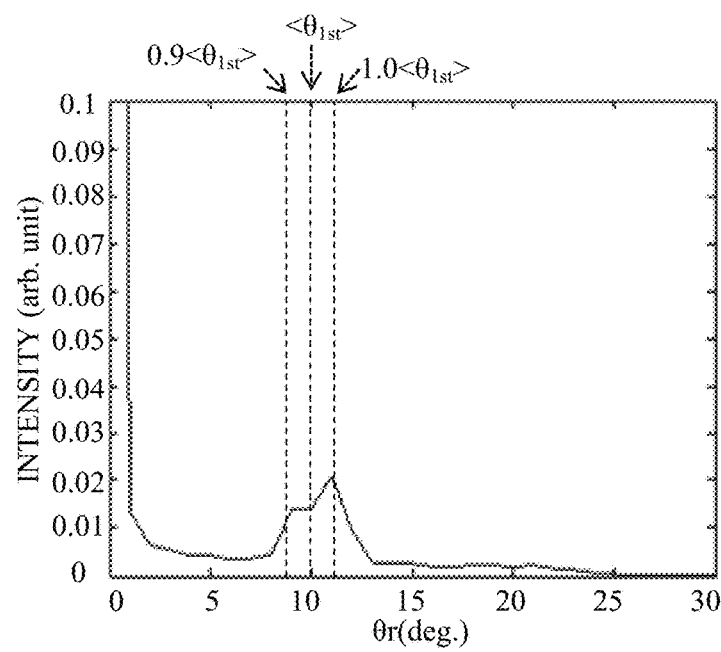

Referring now to FIGS. 7A and 7B, a description will be given of the azimuthal anisotropy in the diffusion angle characteristic of the random uneven shape 100. FIG. 7 is a far field angle distribution diagram when the plane wave with a wavelength A of 550 nm enters part of an area of 25 μm×25 μm on the random uneven shape 100. The far field angle distribution is obtained by Fourier-transforming the electromagnetic distribution calculated by a Finite Difference Time Domain (FDTD) calculation. This embodiment provides the above calculation with a mesh of 25 nm, and a periodic boundary condition. This embodiment uses the incident plane wave having a wavelength λ of 550 nm, but the wavelength λ of the plane view is not strictly limited to 550 nm and may be substantially 550 nm.

FIG. 7A illustrates the far field angle distribution in two orthogonal angular directions θx and θy, and FIG. 7B illustrates the far field angle distribution linearized in the radial direction θr. A scale in each of the angular directions θx and θy is one degree in FIGS. 7A and 7B. As illustrated in FIG. 7B, the intensity concentrates on the average primary diffraction angle $\theta_{1st}$ (=$\sin^{-1}((\lambda/n)/P)$) with little azimuthal anisotropy, where n is a refractive index of the random uneven shape 100, and λ is a wavelength of light entering the random uneven shape 100. For the quantitative evaluation of the azimuthal anisotropy, a standard deviation σaz normalized with the component in a range from $0.9\theta_{1st}$ to $1.1\theta_{1st}$ is calculated in FIG. 7B. This embodiment calculates the standard deviation σaz as 1.14 as illustrated in Table 1. This value is equal to or smaller than a quarter value of the hexagonal ordered structure, which will be described later. Thus, the diffusion on the random uneven shape 100 has a little azimuthal anisotropy and a desired diffusion angle characteristic can be realized. The average primary diffusion $\theta_{1st}$ can be controlled by the average pitch P and enables the intensity to concentrate on the desired angular direction.

Figure 8A:
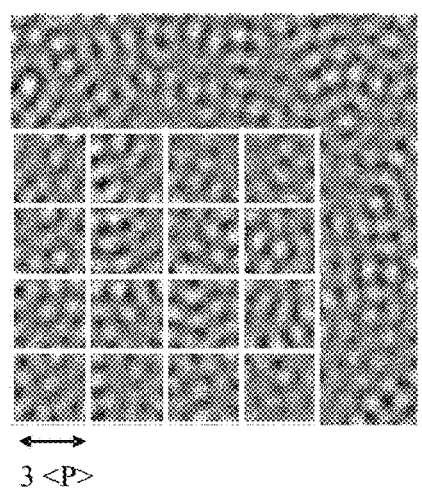
FIGS. 8A, 8B, and 8C illustrate a local frequency spectrum of the random uneven shape according to the first embodiment.
Figure 8B:
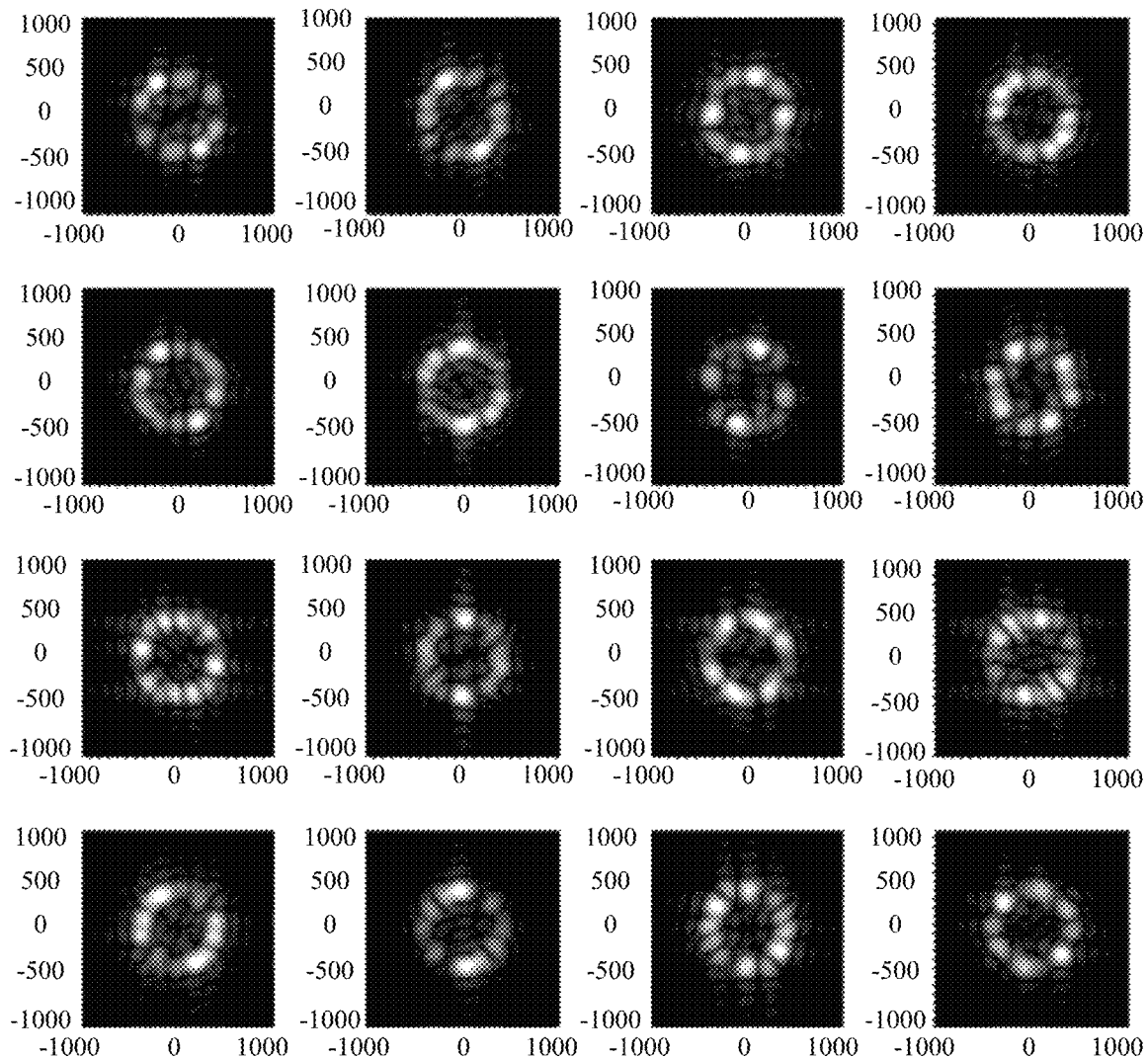
Figure 8C:
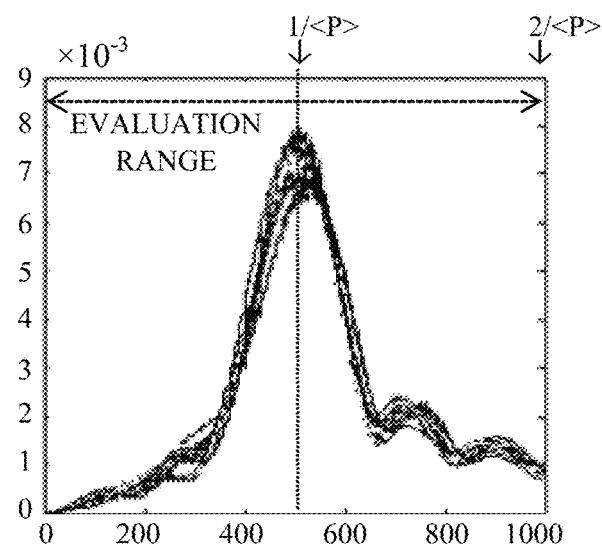

Referring now to FIGS. 8A, 8B, and 8C, a description will be given of scattering of the diffusion angle characteristic on the random uneven shape 100 when a beam diameter becomes small. FIG. 8B illustrates a two-dimensional local frequency spectrum obtained by Fourier-transforming sixteen divided areas of 3P×3P on the random uneven shape 100 illustrated in FIG. 8A. FIG. 8B illustrates a range from −1000 lp/mm to 1000 lp/mm in both of the abscissa axis and the ordinate axis. A deviation of any one of the local spectra in FIG. 8B from the entire frequency spectrum illustrated in FIGS. 4A and 4B is comparatively small. FIG. 8C illustrates the sixteen local frequency spectra linearized in the radial direction. In order to quantitatively illustrate the scattering diffusion angle characteristics in the sixteen local frequency spectra, each frequency spectrum is normalized with the component sum and the standard deviation average σspec of the frequency components is calculated in a range from the spatial frequency of 0 to 2/P. This embodiment calculates the standard deviation average σspec as $2.0 \times 10^{-4}$, as illustrated in Table 1. This value is equal to or smaller than half of a value of the random uneven shape according to a comparative example 1. Since the far field angle distribution depends on the frequency spectrum, a small standard deviation average σspec means small scattering of a diffusion angle characteristic for each local area. This embodiment calculates the standard deviation average σspec based on the sixteen divided areas, but the present invention is not limited to this embodiment as long as the standard deviation σspec is calculated based on the plurality of divided areas.

As described above, when the random uneven shape 100 of this embodiment satisfies the conditional expressions (6) and (7), the random uneven shape 100 has a desired diffusion angle characteristic with a small azimuthal anisotropy and can reduce scattering from the desired diffusion angular characteristic even when a beam with a small diameter enters the random uneven shape 100. When the random uneven shape 100 according to this embodiment is formed on an optical surface of a light diffusion element, the light diffusion element has a desired diffusion angle characteristic with a small azimuthal anisotropy and can reduce scattering from the desired diffusion angle characteristic even when a beam with a small diameter enters the light diffusion element. The random uneven shape 100 is not limited to the structure parameter illustrated in Table 1. For example, when the random uneven shape 100 is formed on the optical surface of the light diffusion element, the average pitch P or the average height h in the structure parameters may be set to an approximately constant multiple in accordance with the desired diffusion angular distribution.

The standard deviation average σspec may satisfy the following conditional expression (8).

$$0.1 \times 10^{-4} \leq \sigma spec \leq 3.0 \times 10^{-4} \quad (8)$$

When the value is larger than the upper limit value in the conditional expression (8), the diffusion angle characteristic in the local area undesirably scatters. When the value is smaller than the lower limit value in the conditional expression (8), the far field angle distribution undesirably contains the azimuthal anisotropy. As described above, the standard deviation average σspec is $2.0 \times 10^{-4}$ in this embodiment, and satisfies the conditional expression (8).

The standard deviation σaz may satisfy the following conditional expression (9).

$$0.1 \leq \sigma az \leq 2.5 \quad (9)$$

When the value is larger than the upper limit value in the conditional expression (9), the far field angle distribution undesirably contains the azimuthal anisotropy. When the value is smaller than the lower limit value in the conditional expression (9), the shape randomness becomes undesirably strong and cannot provide a control for the desired far field angle distribution. This embodiment satisfies the conditional expression (9) because the standard deviation σaz is 1.14, as described above.

The random uneven shape 100 may be formed by the frequency filtering with a random number or a pattern in which a specific shape is randomly arranged. A random uneven shape formed by a method other than this method contains a remaining azimuthal anisotropy in a specific direction and is unlikely to satisfy the conditional expression (8) consequently and undesirably. The random uneven shape formed by the frequency filtering with a random number or a pattern in which a specific shape is randomly arranged has few azimuthal anisotropies in a specific direction and is likely to satisfy the conditional expression (8).

The maximum structure inclination angle φmax in the random uneven shape 100 may satisfy the following conditional expression (10).

$$5.0 \text{ (deg)} \leq \varphi max \leq 76.0 \text{ (deg)} \quad (10)$$

The maximum structure inclination angle φmax is calculated based on a differential value when the shape is divided with a mesh of 100 nm in the XY directions. At this time, when a height difference between adjacent meshes is equal to or larger than 400 nm, the maximum structure inclination angle φmax is larger than 76 degrees and does not satisfy the conditional expression (10). When the value is larger than the upper limit value in the conditional expression (10), for example, the random uneven shape has a steep slope and the manufacturing becomes difficult as in the rectangular structure. A refraction is unlikely to occur at an uneven interface where the random uneven shape has the steep slope component. Since the diffraction efficiency generally improves when the refractive wavefront after transmitting the uneven shape inclines in the diffraction angle direction, the diffusion efficiency is undesirably lowers when the value is larger than the upper limit value in the conditional expression (10). When the value is smaller than the lower limit value in the conditional expression (10), the average pitch P is undesirably and excessively large since the random uneven shape causes a phase delay necessary for the diffusion through the random uneven shape. This embodiment satisfies the conditional expression (10) because the maximum structure inclination angle φmax is calculated as 63.0 degrees as illustrated in Table 1.

The average pitch P on the random uneven shape may satisfy the following conditional expression (11).

$$0.7 \text{ (μm)} \leq P \leq 20.0 \text{ (μm)} \quad (11)$$

When the value is smaller than the lower limit value in the conditional expression (11), the diffusion efficiency is likely to undesirably contain the wavelength dependency. When the value is larger than the upper limit value in the conditional expression (11), local scattering is likely to undesirably occur when light with a small beam diameter enters the random uneven shape. This embodiment satisfies the conditional expression (11) because the average pitch P is 2000 nm as described above.

The average height h on the random uneven shape may satisfy the following conditional expression (12):

$$0.2 \ (\mu m) \leq h \leq 2.5 \ (\mu m) \tag{12}$$

When the value is smaller than the lower limit value in the conditional expression (12), the diffusion efficiency is likely to undesirably lower because the phase delay derived from the random uneven shape is not enough for the diffusion. When the value is larger than the upper limit value in the conditional expression (12), the aspect ratio of the shape is too large, the manufacturing becomes undesirably difficult, and the control over the diffusion angle distribution becomes undesirably difficult due to high order (such as secondary or higher) diffracted light. This embodiment satisfies the conditional expression (12) because the average height h is 900 nm as described above.

The random uneven shape 100 may be formed by the gray scale lithography or nanoimprint lithography. A material may be an organic material or may be an inorganic material from the standpoint of a deflection or durability. In accordance with the application, the best manufacturing method and structure may be selected. The above manufacturing method is merely illustrative and does not limit the effect of the present invention.

Second Embodiment

Figure 9:
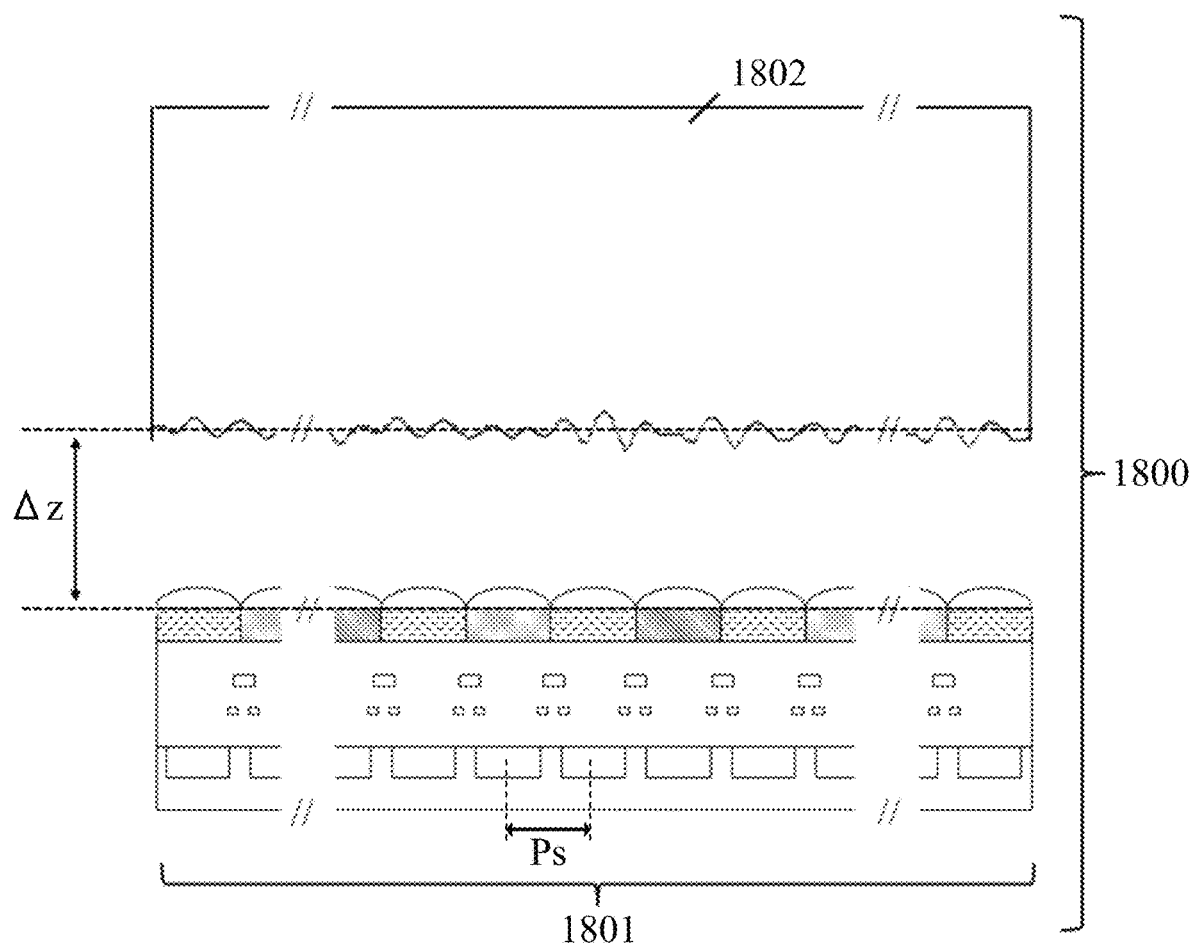
FIG. 9 is a structural view of an image capturing apparatus according to a second embodiment.

FIG. 9 is a configuration diagram of an optical apparatus (image capturing apparatus) 1800 that includes a light diffusion element 1802 having an optical surface of the random uneven shape 100 according to the first embodiment. The optical apparatus 1800 includes an image sensor 1801, and the light diffusion element 1802 apart from the image sensor 1801 by a distance Δz above the image sensor 1801.

The light diffusion element 1802 serves as an optical low-pass filter configured to diffuse a light flux that will enter the image sensor 1801, at a proper angle relative to a pixel pitch Ps. The image sensor 1801 receives light that has transmitted the light diffusion element 1802. Due to the light diffusion action by the light diffusion element 1802, a false resolution is restrained. Given the light diffusion element having the optical surface with the conventional random uneven shape, a diffusion angle characteristic scatters for each local area due to a weak stress concentration in a frequency spectrum and the superimposition of the optical low-pass effects between pixels may be different. On the other hand, when the light diffusion element 1802 is used, the random diffusion angle characteristic is restrained from scattering for each local area and the superimposition of the optical low-pass effects between pixels can be made uniform. This configuration can make uniform the superimposition of the optical low-pass effects when the F-number fluctuates.

Comparative Example 1

A description will be given of a characteristic of a random uneven shape different from the random uneven shape 100. Table 2 summarizes structural parameters in the random uneven shape according to this comparative example.

Figure 10A:
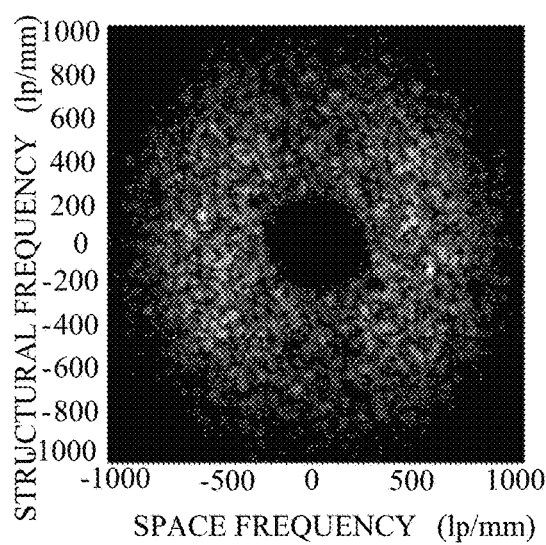
FIGS. 10A and 10B illustrate a frequency spectrum of a random uneven shape according to a comparative example 1.
Figure 10B:
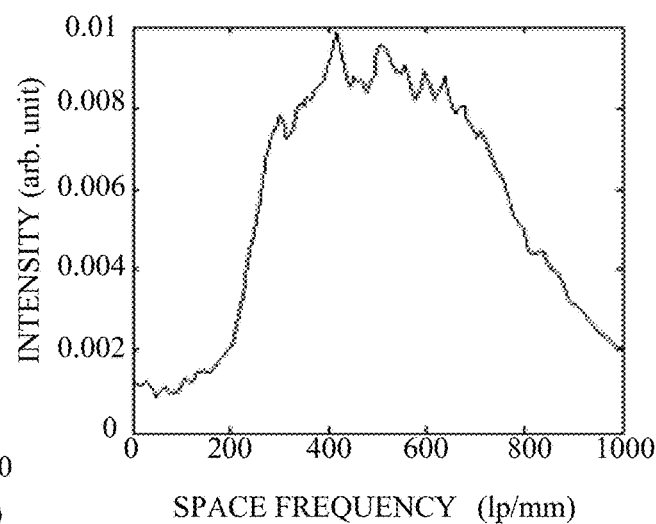

FIGS. 10A and 10B illustrate the frequency spectra of the random uneven shape according to this comparative example. FIG. 10A illustrates a two-dimensional frequency spectrum, and FIG. 10B illustrates the two-dimensional frequency spectrum linearized in a radial direction. The average pitch P on the random uneven shape according to this comparative example is 2000 nm as illustrated in Table 2, and satisfies the conditional expression (11). The ratio $I_{center}$ of the component intensity sum from 0.9P to 1.1P to the entire component intensity sum is calculated as 0.21 as illustrated in Table 2, and does not satisfy the conditional expression (6). The average height h is 900 nm as illustrated in Table 2, and satisfies the conditional expression (12). The average height h is 900 nm, as illustrated in Table 2, and satisfies the conditional expression (12). The maximum structure inclination angle φmax is calculated as 70.2 degrees as illustrated in Table 2, and satisfies the conditional expression (10).

Figure 11A:
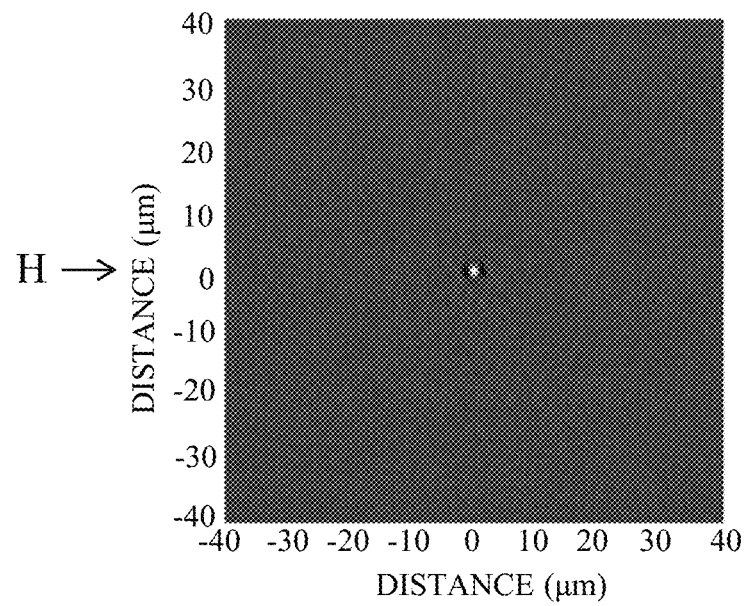
FIGS. 11A and 11B are explanatory views of an autocorrelation function of the random uneven shape according to the comparative example 1.
Figure 11B:
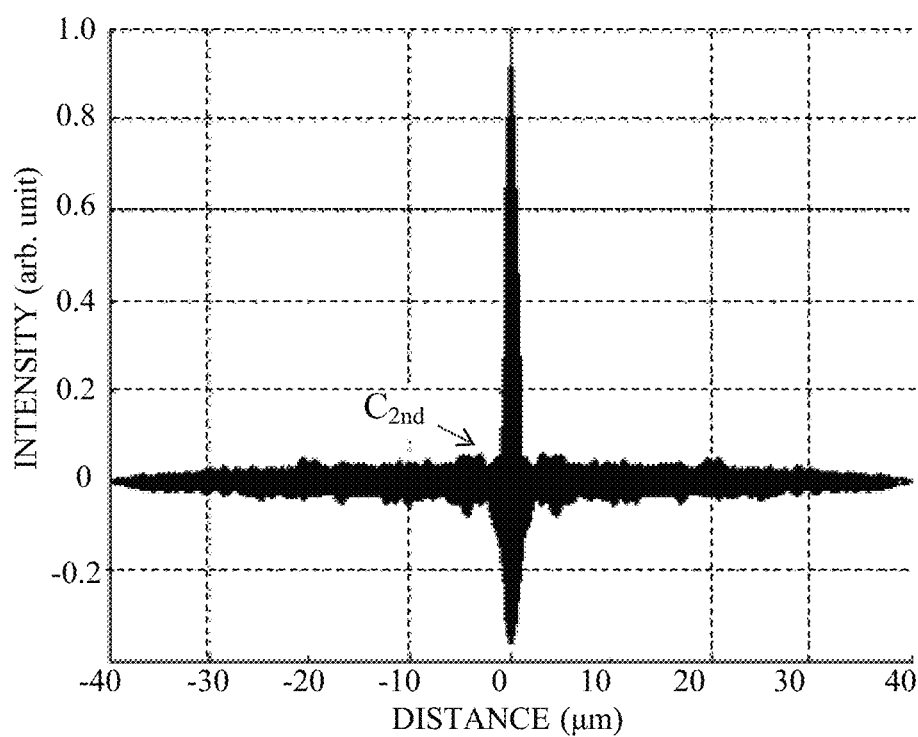

FIGS. 11A and 11B are explanatory views of the autocorrelation function of the random uneven shape according to this comparative example. FIG. 11A is a bird's eye view of the autocorrelation function of the random uneven shape, and FIG. 11B illustrates the autocorrelation function when FIG. 11A is observed in the H direction. The intensity peak value $C_{2nd}$ is 0.06 as illustrated in Table 2, and satisfies the conditional expression (7).

Figure 12A:
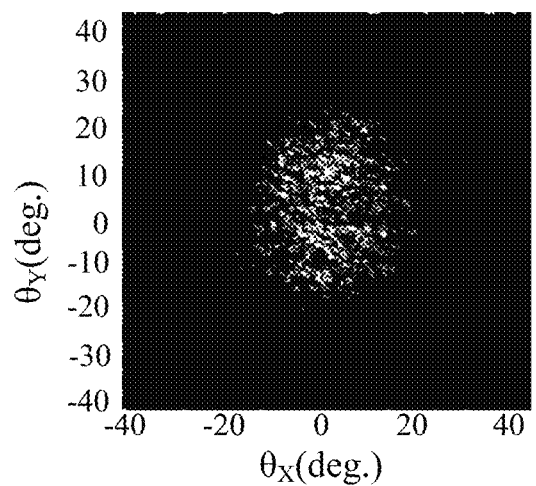
FIGS. 12A and 12B are far field angle distribution views of the random uneven shape according to the comparative example 1.
Figure 12B:
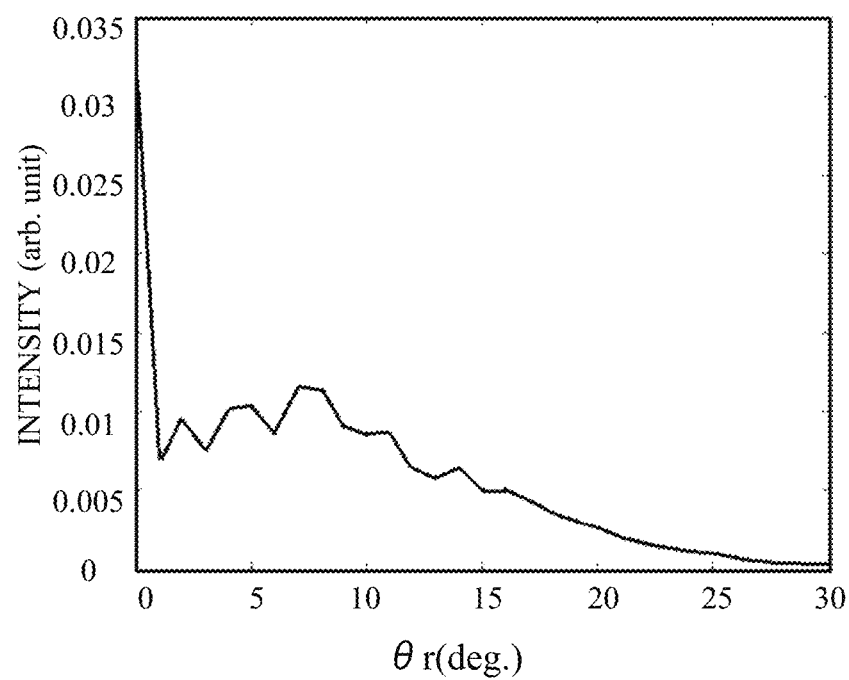

FIGS. 12A and 12B are far field angle distribution diagrams when a plane wave having a wavelength of 550 nm enters part of an area of 25 μm×25 μm on the random uneven shape according to this comparative example. FIG. 12A illustrates the far field angle distribution in two orthogonal angular directions θx and θy. FIG. 12B illustrates the far field angle distribution linearized in a radial direction θr. As illustrated in FIG. 12B, the diffusion angle distribution has few azimuthal anisotropies and the intensity distributes around the average primary diffraction angle $θ_{1st}$ calculated by the average pitch P. The standard deviation σaz calculated for the quantitative evaluation of the azimuthal anisotropy is 1.14 as illustrated in Table 2 and satisfies the conditional expression (9). It is understood as described above that the diffusion by the random uneven shape according to this comparative example has few azimuthal anisotropies and possesses a desired diffusion angle characteristic.

Figure 13A:
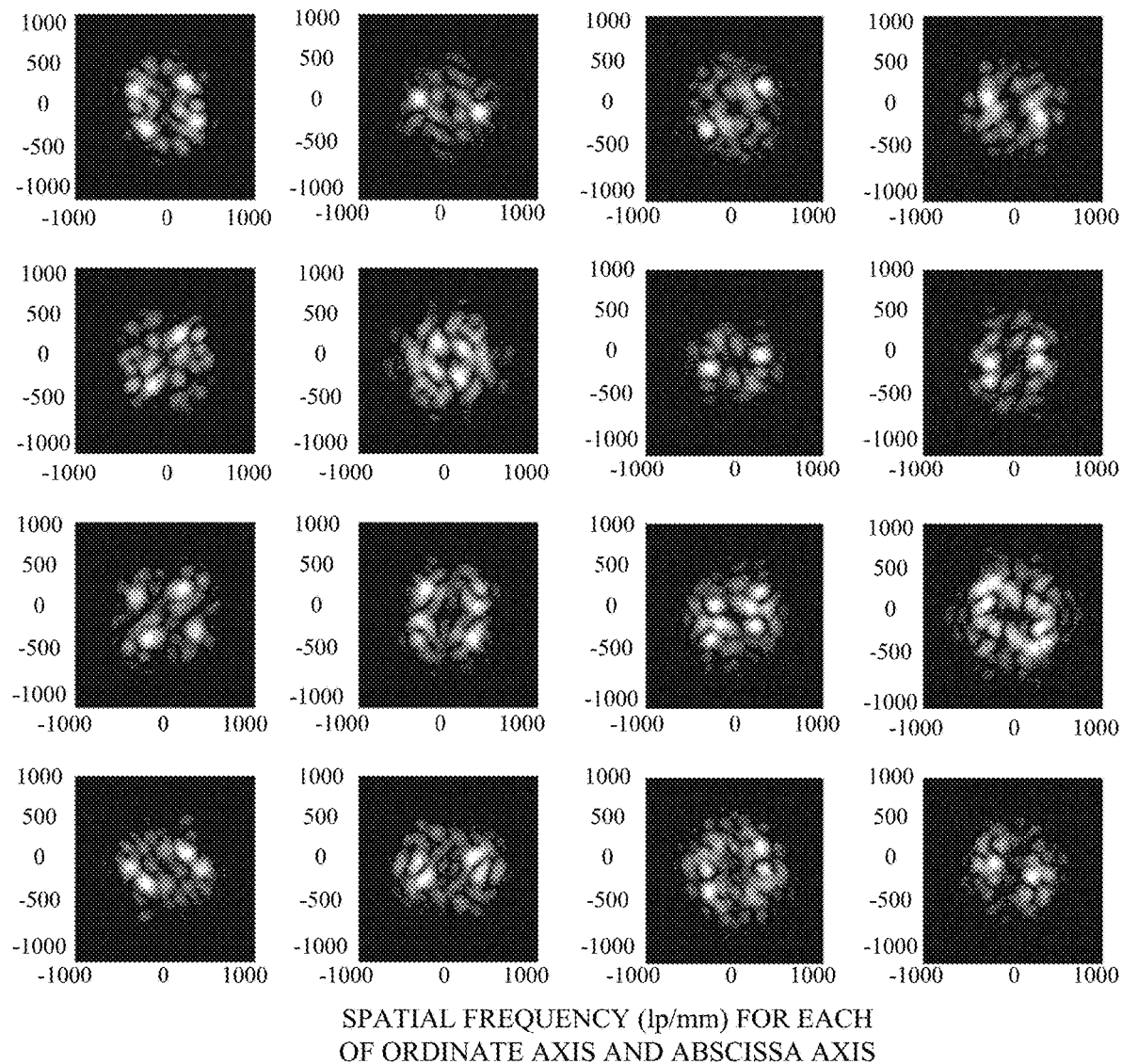
FIGS. 13A and 13B illustrate local frequency spectra of the random uneven shape according to the comparative example 1.
Figure 13B:
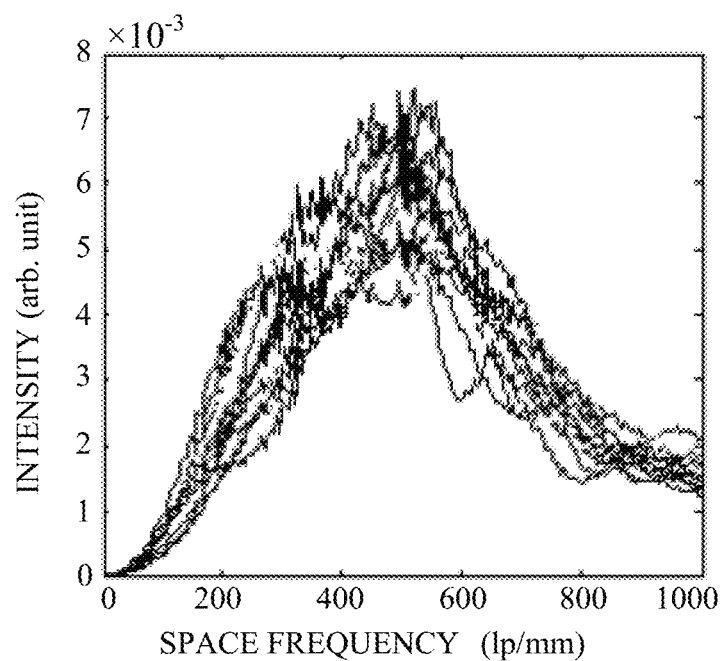

On the other hand, the diffusion by the random uneven shape according to this comparative example significantly scatters in diffusion angle characteristic for an incident beam with a small diameter. FIG. 13A illustrates a two-dimensional local frequency spectrum obtained by Fourier-transforming sixteen divided areas of 3P×3P on the random uneven shape according to this comparative example. A deviation of any one of the local spectrum in each FIG. 13A from the entire frequency spectrum illustrated in FIGS. 10A and 10B is large and scattering of the diffusion angle characteristic for each local area is large. The standard deviation average σspec quantitatively representing a magnitude of the deviation in the spectrum calculated with FIG. 13B is $5.1 \times 10^{-4}$ as illustrated in Table 2, and does not satisfy the conditional expression (8).

As described above, when the conditional expression (1) is not satisfied, the standard deviation average σspec is large and the diffusion angle characteristic significantly scatters for each local area. Thus, the random uneven shape according to this comparative example has a desired diffusion angle characteristic with a small azimuthal anisotropy but scattering from the desired diffusion angle characteristic is large when a beam with a small diameter enters the random uneven shape.

Comparative Example 2

Figure 14:
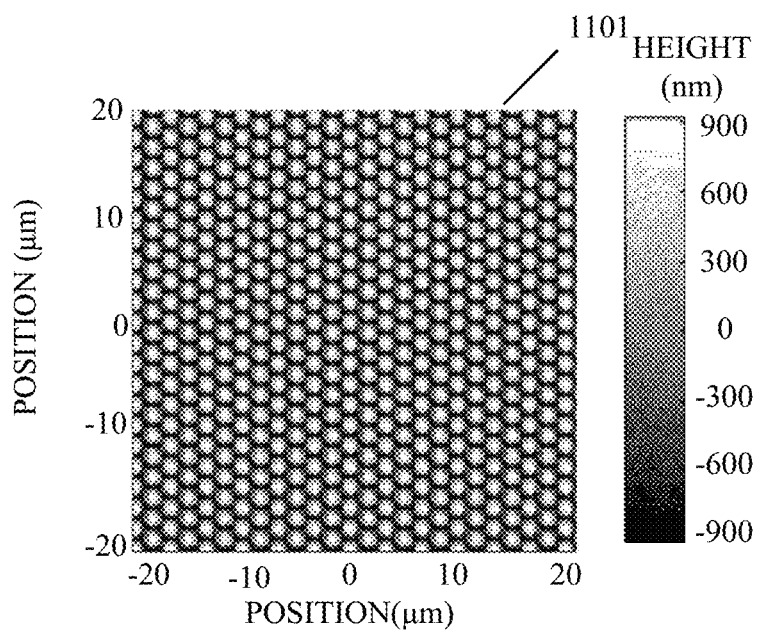
FIG. 14 illustrates an ordered uneven shape according to a comparative example 2.

FIG. 14 is a bird's eye view of an ordered uneven shape 1100 according to this comparative example. In the ordered uneven shape 1100, a fundamental shape is hexagonally ordered with a period of I=cos²(r) where r is a distance from the origin. Table 3 summarizes the structure parameters in the ordered uneven shape 1100.

Figure 15A:
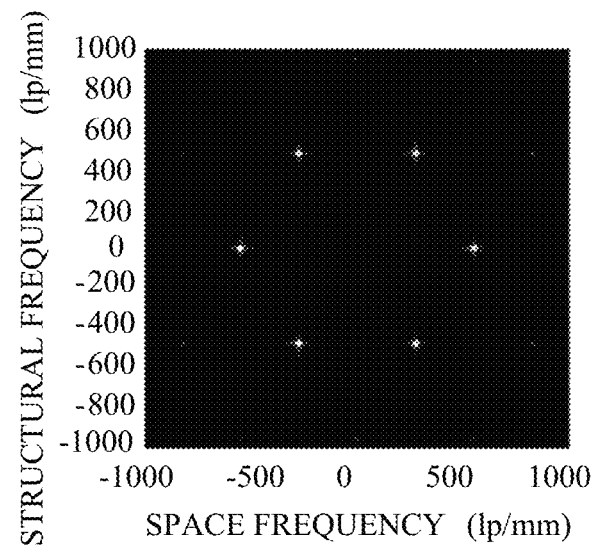
FIGS. 15A and 15B illustrate a frequency spectrum of the ordered uneven shape according to the comparative example 2.
Figure 15B:
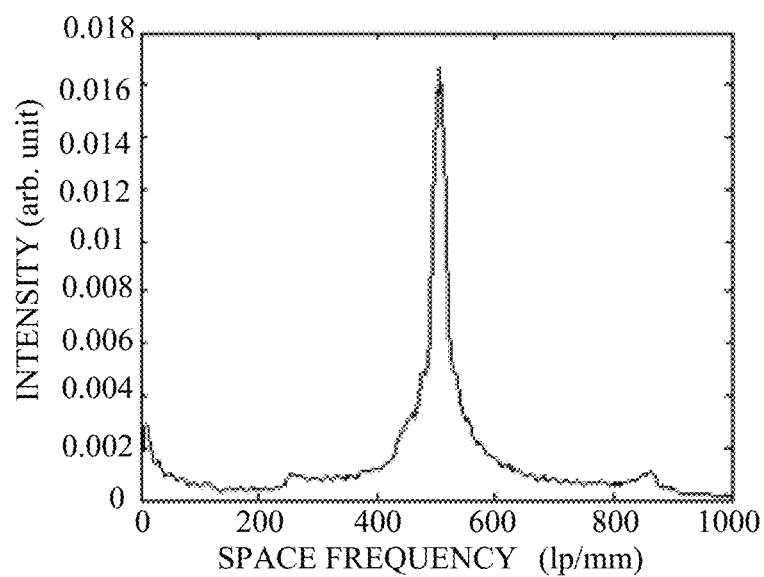

FIGS. 15A and 15B illustrate frequency spectra of the ordered uneven shape 1100. FIG. 15A illustrates the two-dimensional frequency spectrum, and FIG. 15B illustrates the two-dimensional frequency spectrum linearized in the radial direction. The average pitch P in the ordered uneven shape 1100 is 2000 nm as illustrated in Table 3, and satisfies the conditional expression (11). The ratio $I_{center}$ of the component intensity sum from 0.9P to 1.1P to the entire component intensity sum is 0.52 as illustrated in Table 3 and satisfies the conditional expression (6). The average height h is 900 nm as illustrated in Table 3, and satisfies the conditional expression (12). The maximum structure inclination angle φmax is calculated as 69.6 degrees as illustrated in Table 3, and satisfies the conditional expression (10).

Figure 16A:
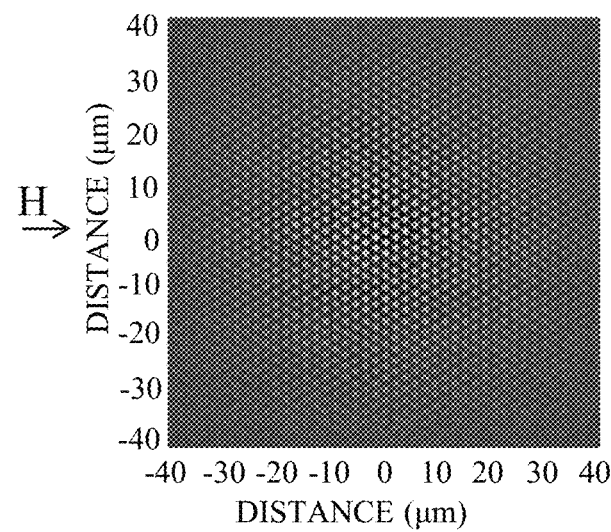
FIGS. 16A and 16B are explanatory views of an autocorrelation function of the ordered uneven shape according to the comparative example 2.
Figure 16B:
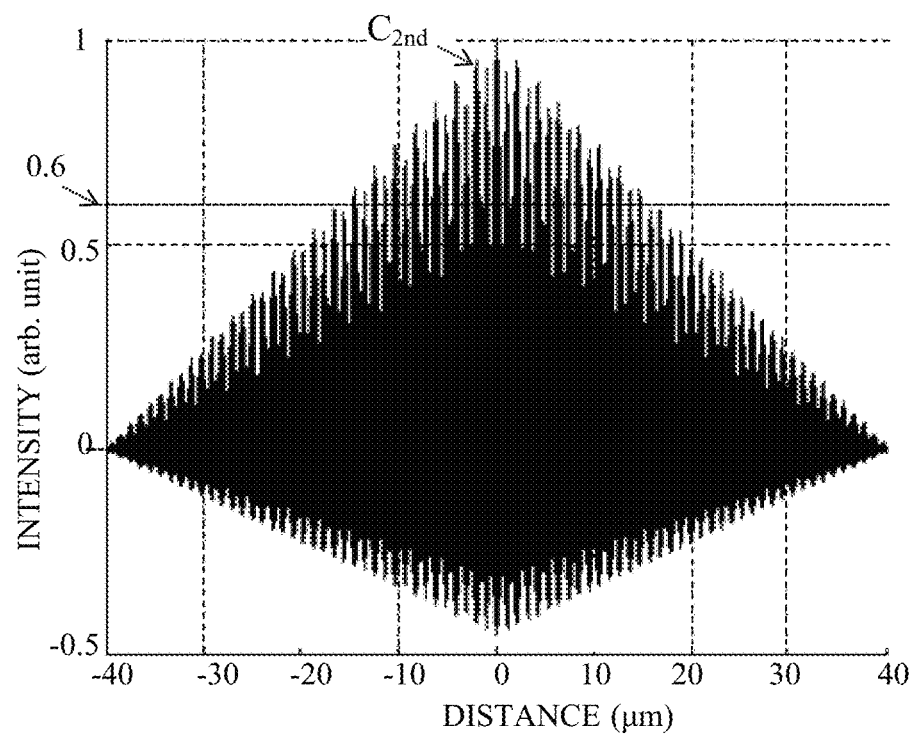

FIGS. 16A and 16B are explanatory views of the autocorrelation function of the ordered uneven shape 1100 according to this comparative example. FIG. 16A is a bird's eye view of the autocorrelation function of the ordered uneven shape 1100, and FIG. 16B illustrates the autocorrelation function when FIG. 16A is observed in the H direction. The intensity peak value $C_{2nd}$ is 0.95 as illustrated in Table 2, and does not satisfy the conditional expression (7).

Figure 17A:
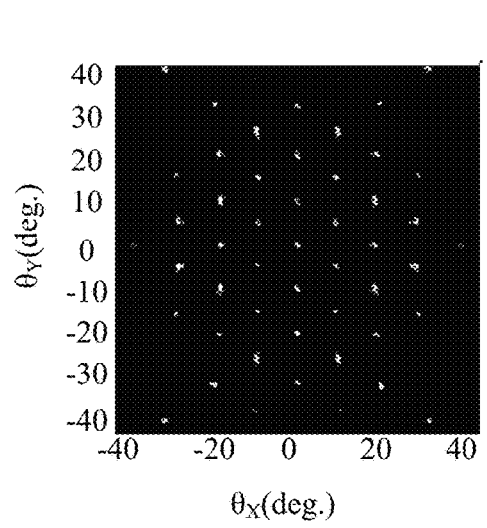
FIGS. 17A and 17B are far field angle distribution diagrams of the ordered uneven shape according to the comparative example 2.
Figure 17B:
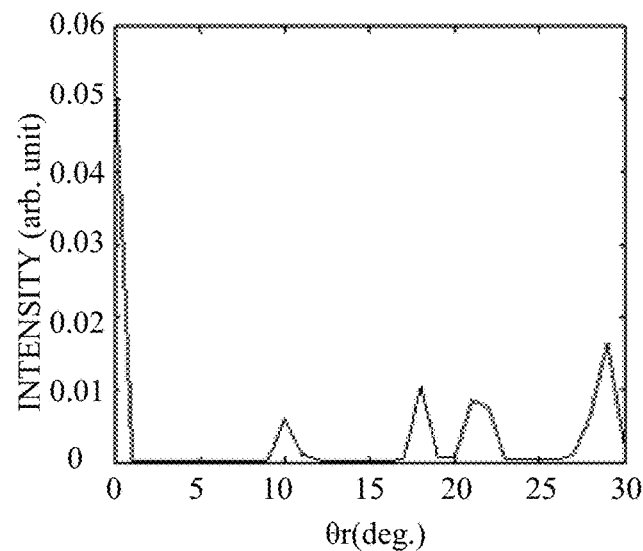

FIGS. 17A and 17B are far field angle distribution diagrams when a plane wave having a wavelength of 550 nm enters part of an area of 25 μm×25 μm on the ordered uneven shape 1100. FIG. 17A illustrates the far field angle distribution in two orthogonal angular directions θx and θy. FIG. 17B illustrates the far field angle distribution linearized in a radial direction θr. The diffusion angle distribution in FIG. 17A has the azimuthal anisotropy and contains a high order diffracted light component in addition to the average primary diffraction angle $\theta_{1st}$ calculated based on the average pitch P. The standard deviation σaz calculated for the quantitative evaluation of the azimuthal anisotropy is 5.07 as illustrated in Table 3 and does not satisfy the conditional expression (9). As described above, this value is a value four time as large as the random uneven shape 100 and it is understood that the diffusion by the random uneven shape 1100 contains a large azimuthal anisotropy.

Figure 18A:
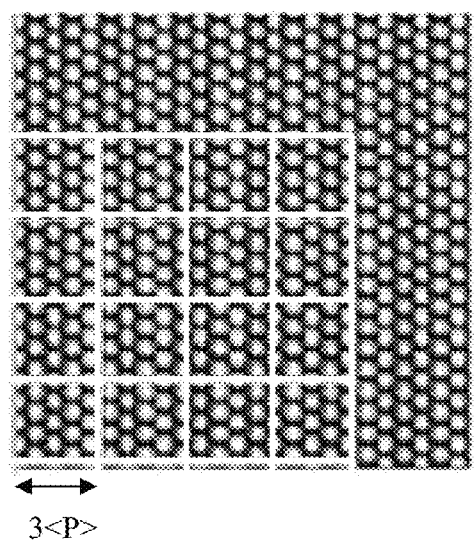
FIGS. 18A, 18B, and 18C illustrate local frequency spectra with the ordered uneven shape according to the comparative example 2.
Figure 18B:
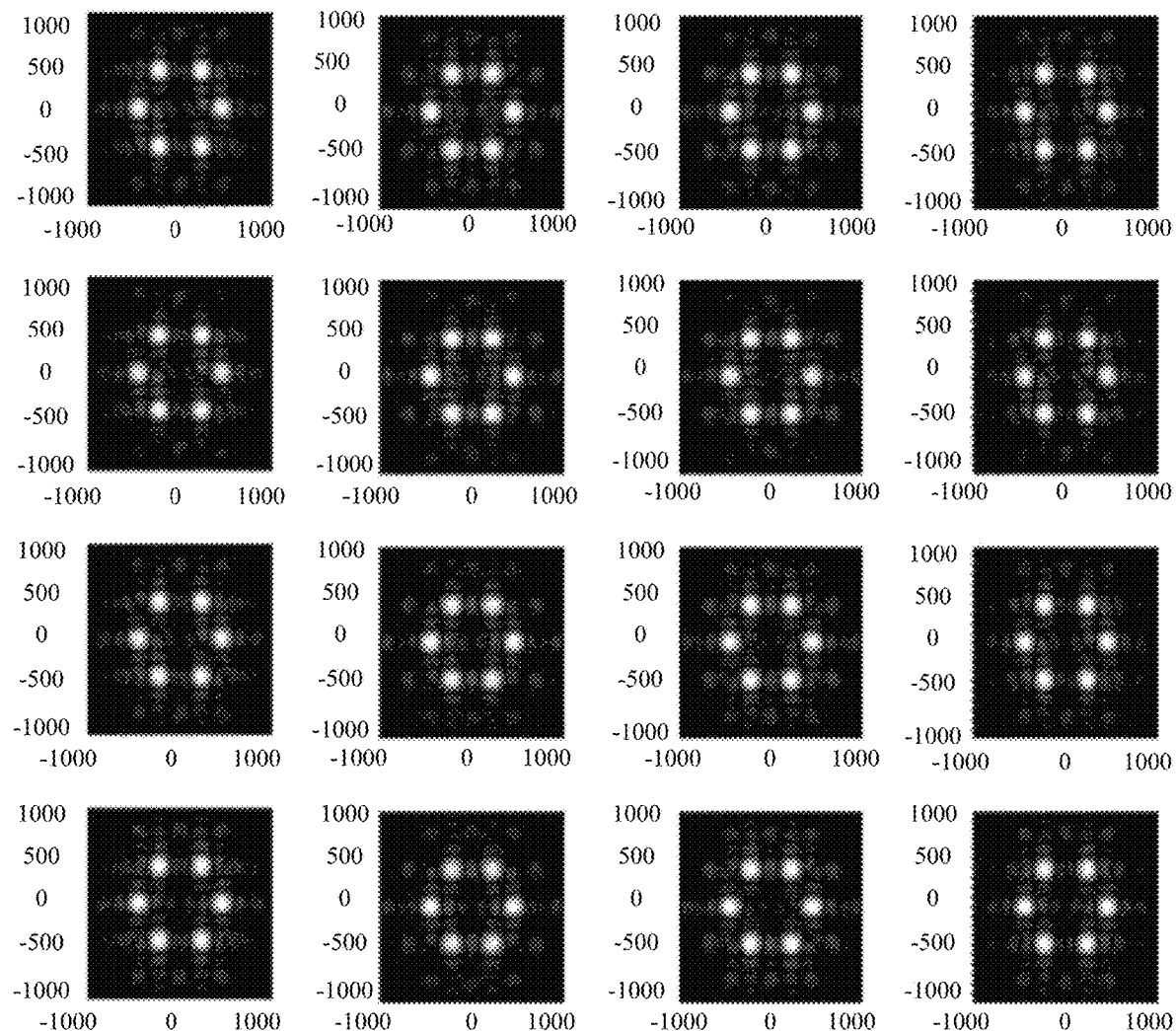
Figure 18C:
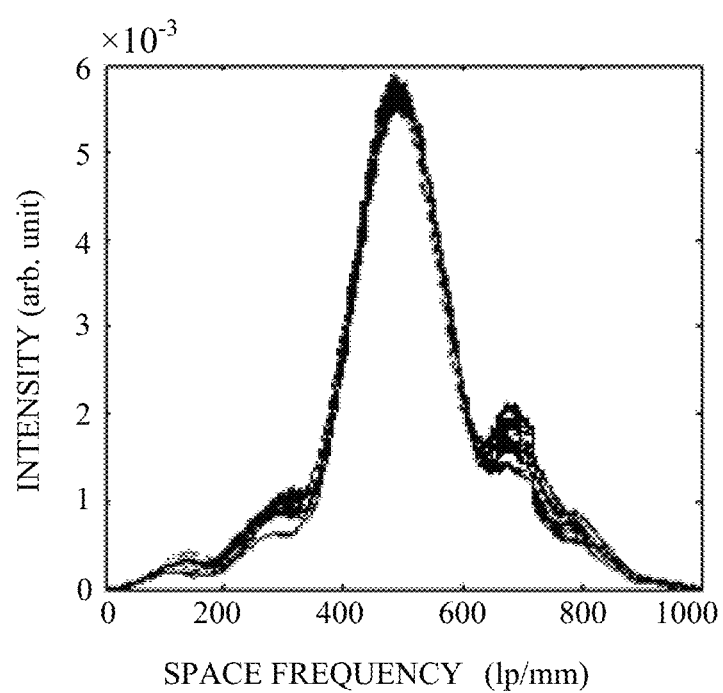

FIG. 18B is a two-dimensional local frequency spectrum obtained by Fourier-transforming sixteen divided areas of 3P×3P on the ordered uneven shape 1100 illustrated in FIG. 18A. The standard deviation average σspec quantitatively representing a magnitude of the deviation of the spectrum calculated with FIG. 18C is $1.1 \times 10^{-4}$ as illustrated in Table 3, and satisfies the conditional expression (8). A small standard deviation average σspec means small scattering of the diffusion angle characteristic for each local area.

As described above, the ordered uneven shape 1100 according to this comparative example has a large azimuthal anisotropy and low controllability over the diffusion angle distribution due to a high order diffracted light component.

TABLE 1

FIRST EMBODIMENT

| CONDITIONAL EXPRESSION (11) | CONDITIONAL EXPRESSION (12) | |
|---|---|---|
| P (nm) 2000 | h (nm) 900 | REFRACTIVE INDEX n 1.5 |
| CONDITIONAL EXPRESSION (6) | CONDITIONAL EXPRESSION (7) | CONDITIONAL EXPRESSION (8) |
| $I_{center}$ 0.57 | $C_{2nd}$ 0.18 | σspec 0.00020 |
| CONDITIONAL EXPRESSION (9) | CONDITIONAL EXPRESSION (10) | |
| σaz 1.14 | Φmax (deg) 63.0 | |

TABLE 2

COMPARATIEVE EXAMPLE 1

| CONDITIONAL EXPRESSION (11) | CONDITIONAL EXPRESSION (12) | |
|---|---|---|
| P (nm) 2000 | h (nm) 900 | REFRACTIVE INDEX n 1.5 |
| CONDITIONAL EXPRESSION (6) | CONDITIONAL EXPRESSION (7) | CONDITIONAL EXPRESSION (8) |
| $I_{center}$ 0.21 | $C_{2nd}$ 0.06 | σspec 0.00051 |
| CONDITIONAL EXPRESSION (9) | CONDITIONAL EXPRESSION (10) | |
| σaz 0.99 | Φmax (deg) 70.2 | |

TABLE 3

COMPARATIVE EXAMPLE 2

| CONDITIONAL EXPRESSION (11) | CONDITIONAL EXPRESSION (12) | |
|---|---|---|
| P (nm) 2000 | h (nm) 900 | REFRACTIVE INDEX n 1.5 |
| CONDITIONAL EXPRESSION (6) | CONDITIONAL EXPRESSION (7) | CONDITIONAL EXPRESSION (8) |
| $I_{center}$ 0.52 | $C_{2nd}$ 0.95 | σspec 0.00011 |
| CONDITIONAL EXPRESSION (9) | CONDITIONAL EXPRESSION (10) | |
| σaz 5.07 | Φmax (deg) 69.6 | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-152039, filed on Aug. 2, 2016, which is hereby incorporated by reference herein in its entirety.

What is claimed is:

1. An optical element comprising an optical surface with a random uneven shape that satisfies the following conditional expressions:

$$0.30 \leq I_{center} \leq 1.00;$$

$$0.00 \leq C_{2nd} \leq 0.60; \text{ and}$$

$$0.1 \times 10^{-4} \leq \sigma spec \leq 3.0 \times 10^{-4},$$

where P is an average pitch on the random uneven shape, $I_{center}$ is a ratio of a component intensity sum from 0.9P to 1.1P to a component intensity sum of an entire frequency spectrum calculated with a square area in which each side is equal to or longer than 40 μm on the optical surface, $C_{2nd}$ is a value of a second largest intensity peak in an autocorrelation function calculated with a square area in which each side is 20P on the optical surface, and σspec is an average of standard deviation of frequency components in a special frequency from 0 to 2/P in each of a plurality of 3P×3P divided areas on the optical surface.

2. The optical element according to claim 1, wherein σspec is a value calculated based on a plurality of spectra made by linearizing each of a two-dimensional frequency spectra into one dimension along a radial direction, the each of a two-dimensional frequency spectra obtained by Fourier-transforming each of the plurality of divided areas.

3. The optical element according to claim 1, wherein the number of divided areas is sixteen.

4. The optical element according to claim 1, wherein the following conditional expressions are satisfied:

$$\theta_{1st} = \sin^{-1}((\lambda/n)/P)$$

$$0.1 \leq \sigma az \leq 2.5$$

where $\theta_{1st}$ is an average primary diffraction angle, n is a refractive index of the optical surface, λ is a wavelength of light entering the optical surface, and σaz is a standard deviation of component in a range from $0.9\theta_{1st}$ to $1.1\theta_{1st}$ in a far field angle distribution obtained when a plane wave enters the optical surface.

5. The optical element according to claim 4, wherein the λ is 550 nm.

6. The optical element according to claim 1, wherein the following conditional expression is satisfied: satisfies the following conditional expression:

$$5.0 \text{ (deg)} \leq \varphi max \leq 76.0 \text{ (deg)},$$

where φmax is a maximum structure inclination angle on the random uneven shape.

7. The optical element according to claim 1, wherein the following conditional expression is satisfied:

$$0.7 \text{ (μm)} \leq P \leq 20.0 \text{ (μm)}.$$

8. The optical element according to claim 1, wherein the following conditional expression is satisfied:

$$0.2 \text{ (μm)} \leq h \leq 2.5 \text{ (μm)}$$

where h is an average height on the random uneven shape.

9. The optical element according to claim 1, wherein the optical element is a light diffusion element.

10. An image capturing apparatus comprising:
the optical element according to claim 1; and
an image sensor configured to receive light from the optical element.

11. A method for forming a random uneven shape on an optical surface of an optical element comprising the step of frequency-filtering a random number or a pattern in which a specific shape is randomly disposed,
wherein the random uneven shape satisfies the following conditional expressions:

$$0.30 \leq I_{center} \leq 1.00;$$

$$0.00 \leq C_{2nd} \leq 0.60; \text{ and}$$

$$0.1 \times 10^{-4} \leq \sigma spec \leq 3.0 \times 10^{-4},$$

where P is an average pitch on the random uneven shape, $I_{center}$ is a ratio of a component intensity sum from 0.9P to 1.1P to a component intensity sum of an entire frequency spectrum calculated with a square area in which each side is equal to or longer than 40 μm on the optical surface, $C_{2nd}$ is a value of a second largest intensity peak in an autocorrelation function calculated with a square area in which each side is 20P on the optical surface, and σspec is an average of standard deviation of frequency components in a special frequency from 0 to 2/P in each of a plurality of 3P×3P divided areas on the optical surface.

12. An optical element comprising an optical surface with a random uneven shape that satisfies the following conditional expressions:

$$0.30 \leq I_{center} \leq 1.00,$$

$$0.00 \leq C_{2nd} \leq 0.60;$$

$$\theta_{1st} = \sin^{-1}((\lambda/n)/P); \text{ and}$$

$$0.1 \leq \sigma az \leq 2.5,$$

where P is an average pitch on the random uneven shape, $I_{center}$ is a ratio of a component intensity sum from 0.9P to 1.1P to a component intensity sum of an entire frequency spectrum calculated with a square area in which each side is equal to or longer than 40 μm on the optical surface, $C_{2nd}$ is a value of a second largest intensity peak in an autocorrelation function calculated with a square area in which each side is 20P on the optical surface, $\theta_{1st}$ is an average primary diffraction angle, n is a refractive index of the optical surface, λ is a wavelength of light entering the optical surface, and σaz is a standard deviation of component in a range from $0.9\theta_{1st}$ to $1.1\theta_{1st}$ in a far field angle distribution obtained when a plane wave enters the optical surface.

* * * * *